(12) United States Patent
Mikan et al.

(10) Patent No.: US 8,812,060 B2
(45) Date of Patent: *Aug. 19, 2014

(54) AUTO DIMMING THROUGH CAMERA USE

(71) Applicant: AT&T Mobility II LLC, Atlanta, GA (US)

(72) Inventors: Jeffrey Clinton Mikan, Atlanta, GA (US); Justin McNamara, Dunwoody, GA (US); John Ervin Lewis, Lawrenceville, GA (US); Fulvio Arturo Cenciarelli, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/687,619

(22) Filed: Nov. 28, 2012

(65) Prior Publication Data
US 2013/0090149 A1 Apr. 11, 2013

Related U.S. Application Data

(63) Continuation of application No. 12/339,344, filed on Dec. 19, 2008, now Pat. No. 8,351,990.

(51) Int. Cl.
*H04B 1/38* (2006.01)
(52) U.S. Cl.
USPC ............ 455/566; 455/556.1; 455/550.1; 455/127.5; 455/573
(58) Field of Classification Search
USPC ............ 455/566, 556.1, 550.1, 127.5, 573, 455/562.1, 574
See application file for complete search history.

(56) References Cited

U.S. PATENT DOCUMENTS

| 7,797,024 | B2 | 9/2010 | Sutardja |
| 7,889,987 | B2 | 2/2011 | Nitanda |
| 8,351,990 | B2 * | 1/2013 | Mikan et al. .............. 455/566 |
| 2004/0127198 | A1 * | 7/2004 | Roskind et al. .......... 455/412.2 |
| 2006/0139522 | A1 | 6/2006 | Chang et al. |
| 2007/0081094 | A1 | 4/2007 | Ciudad et al. |
| 2007/0146356 | A1 * | 6/2007 | Ladouceur ................. 345/207 |
| 2007/0230941 | A1 | 10/2007 | Smith et al. |
| 2008/0036591 | A1 | 2/2008 | Ray |
| 2008/0218501 | A1 * | 9/2008 | Diamond .................... 345/207 |
| 2008/0303918 | A1 * | 12/2008 | Keithley ................... 348/223.1 |
| 2009/0128530 | A1 * | 5/2009 | Ek .............................. 345/207 |
| 2009/0278828 | A1 * | 11/2009 | Fletcher et al. ............ 345/207 |
| 2009/0309711 | A1 | 12/2009 | Adappa et al. |
| 2010/0001978 | A1 * | 1/2010 | Lynch et al. ................ 345/175 |
| 2010/0182294 | A1 * | 7/2010 | Roshan et al. .............. 345/207 |
| 2010/0187406 | A1 | 7/2010 | Van Dalen et al. |

* cited by examiner

*Primary Examiner* — Linh Nguyen
(74) *Attorney, Agent, or Firm* — Baker & Hostetler LLP

(57) ABSTRACT

The use of a digital camera in communication with a mobile device to determine the intensity of ambient light conditions is described herein. In one example, the digital camera receives light energy representing ambient light. The intensity of the ambient light is determined and, based upon a comparison of that intensity to a setpoint, the mobile device is reconfigured. In another example, a mobile device is described that uses a digital camera to measure ambient light conditions. The mobile device can be configured in various ways based upon a determination of the intensity and/or wavelengths of the ambient light.

10 Claims, 6 Drawing Sheets

AUTO DIMMING THROUGH CAMERA USE

CROSS REFERENCE TO RELATED APPLICATIONS

The instant application is a continuation of, and claims priority to, U.S. patent application Ser. No. 12/339,344, filed Dec. 19, 2008. U.S. patent application Ser. No. 12/339,344 is incorporated by reference herein in its entirety.

BACKGROUND

The performance and capabilities of mobile devices typically are affected by two primary factors: the size of the mobile device and its effective battery life. As consumer demand forces manufacturers to provide an increasing set of capabilities, the amount of processing capability and components to carry out those functions also increase. This causes tension with the need to keep the mobile device the same size, or in usual circumstances in the marketplace, smaller. Coupled with increased power needs, designers of mobile devices are under an increased pressure to find ways in which to place more functionality into a mobile device.

SUMMARY

To provide increased functionality while minimizing redundancy of components, a digital camera in communication with the mobile device is used to measure ambient light conditions and adjust various functionalities of the mobile device as a result of the measurement. For example, the digital camera may measure the intensity of light in the visible spectrum and adjust the backlight of the mobile device accordingly. Further, the digital camera may be used to determine various spectral frequencies that indicate a certain location of the mobile device. For example, the digital camera may be used to determine if the mobile device is located inside an office building (i.e. specific wavelengths indicating fluorescent lights are measured). The indication that the mobile device may be inside may be used to control certain features of the device, such as turning off of a global positioning service.

In an exemplary embodiment, a method and system are described in which light energy representing ambient light is received at an aperture of a digital camera in communication with a mobile device. The intensity of the ambient light is determined and compared to a setpoint to generate a reconfiguration output. The output is used to adjust various features of the mobile device, including backlight levels for the display or the keypad.

BRIEF DESCRIPTION OF THE DRAWINGS

The foregoing and other aspects of location-aware voicemail will be better understood from the following detailed description with reference to the drawings.

DETAILED DESCRIPTION OF ILLUSTRATIVE EMBODIMENTS

The subject matter of the various embodiments is described with specificity to meet statutory requirements. However, the description itself is not intended to limit the scope of this patent. Rather, the inventor has contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly required. It should be understood that the explanations illustrating data or signal flows are only exemplary. The following description is illustrative and non-limiting to any one aspect.

In the example in which ambient light intensity is used to control the level of backlight for a display or keypad of a mobile device, to, for example, conserve battery power while providing illumination to a keypad or display, a mobile device may utilizes a measurement of the ambient light using a digital camera as an input. If a measurement indicates that the intensity of the ambient light is low or non-existent, the mobile device may illuminate the keypad as the conditions may indicate a darkened environment. By contrast, if the ambient light intensity is significant, the mobile device may reduce or eliminate the keypad backlight level to minimize battery energy consumption. Additionally, the display of the mobile device may have the same or a separate backlight source. During usage, the display typically will be brighter in higher ambient light conditions to see the screen and dimmer at night, while the opposite may be the situation for the keypad. Typically, the ambient light is measured by an ambient light sensor. But, as mobile device technology advances with increasing capabilities while maintaining or reducing the size of the mobile device, it may be more efficient and effective to reconfigure the device to reduce or eliminate the need for a separate ambient light sensor.

Figure 1:
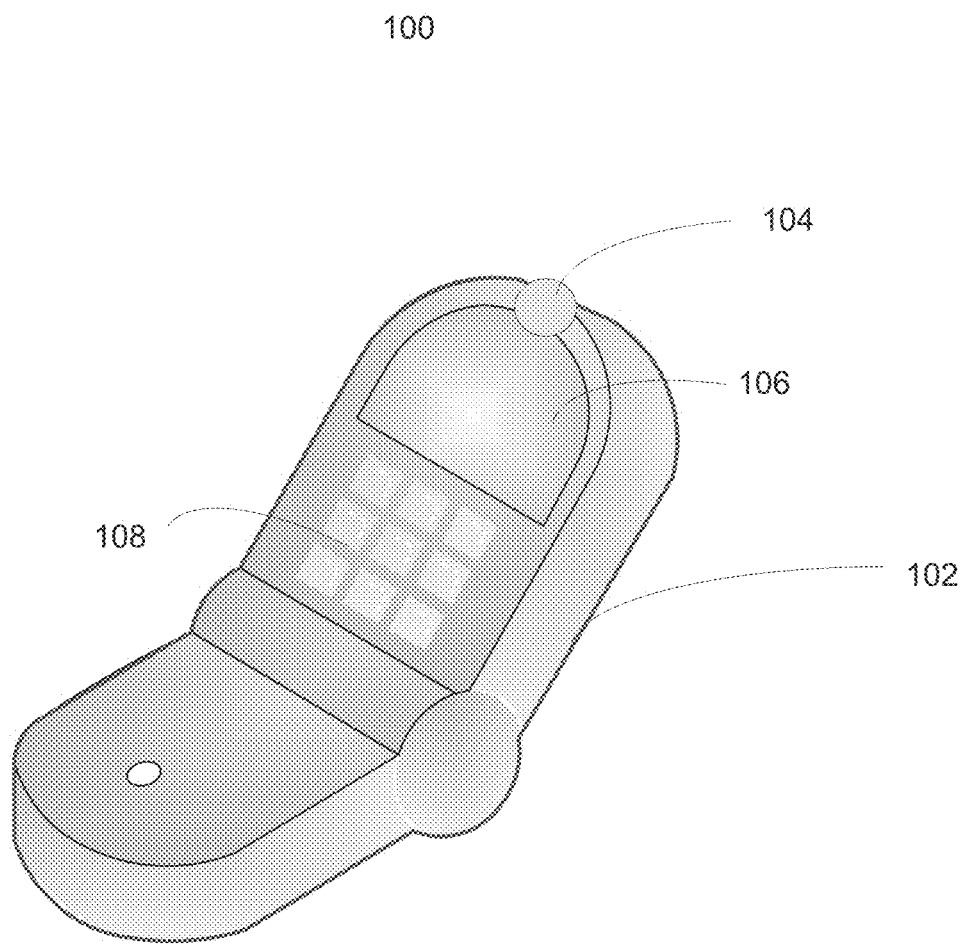
FIG. 1 is an illustration of an exemplary and non-limiting simplified example of a cellular phone using a digital camera in accordance with the present subject matter.

Thus, as is described in the present subject matter, a digital camera in communication with the mobile device may be configured to provide an input of ambient light conditions to the mobile device, thus eliminating the need for an ambient light sensor. FIG. 1 is an illustration of a mobile device configured in accordance with the present invention. As shown, apparatus 100 comprises mobile device 102, which in FIG. 1 is a cellular telephone, and includes a digital camera 104. Digital camera 104 is configured to receive at the aperture (not shown) of digital camera 104 light energy that represents ambient light conditions. The ambient light conditions, e.g. intensity, are determined and compared to a setpoint. If the intensity is of a certain level above or below a setpoint, the amount of backlighting for display 106 and/or keypad 108 of mobile device 102 may be adjusted. Alternatively, there may be a range of setpoints such that the amount of backlighting for display 106 and/or keypad 108 may be adjusted in increments based on the range of setpoints.

Figure 2:
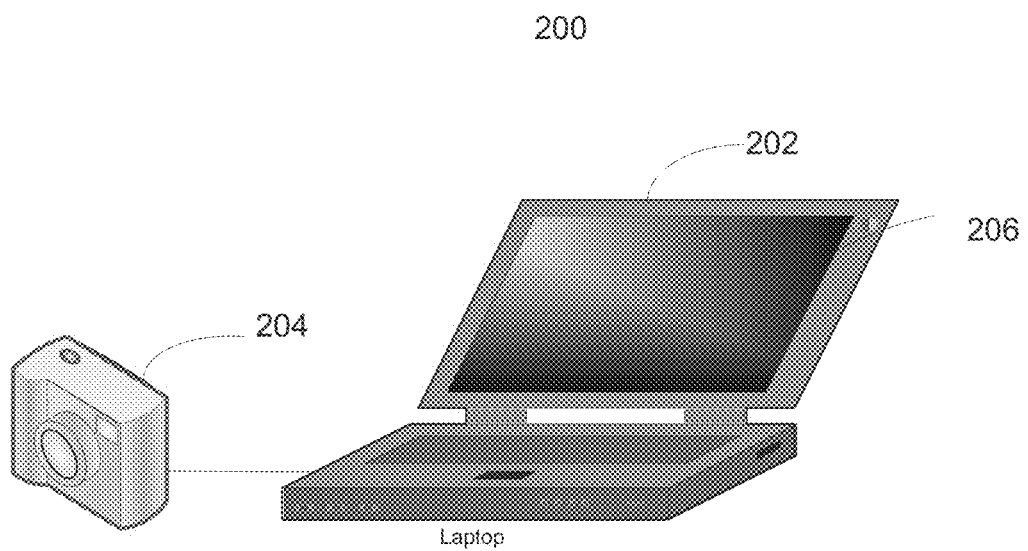
FIG. 2 is an illustration of an exemplary and non-limiting simplified example of a laptop using a digital camera in accordance with the present subject matter.

FIG. 2 is an illustration of a different mobile device apparatus configured in accordance with the present subject matter. Mobile apparatus 200 comprises a mobile computer, laptop 202 and digital camera 204 in communication with laptop 202. Digital camera 204 may be of various types, including a web camera that is removable from laptop 202. As with digital camera 104 of FIG. 1, digital camera 204 of FIG. 2 is configured to receive light energy through an aperture forming part of the lens. The measurement of the light energy is used to adjust the amount of backlighting provided to display 206 of laptop 202.

Figure 3:
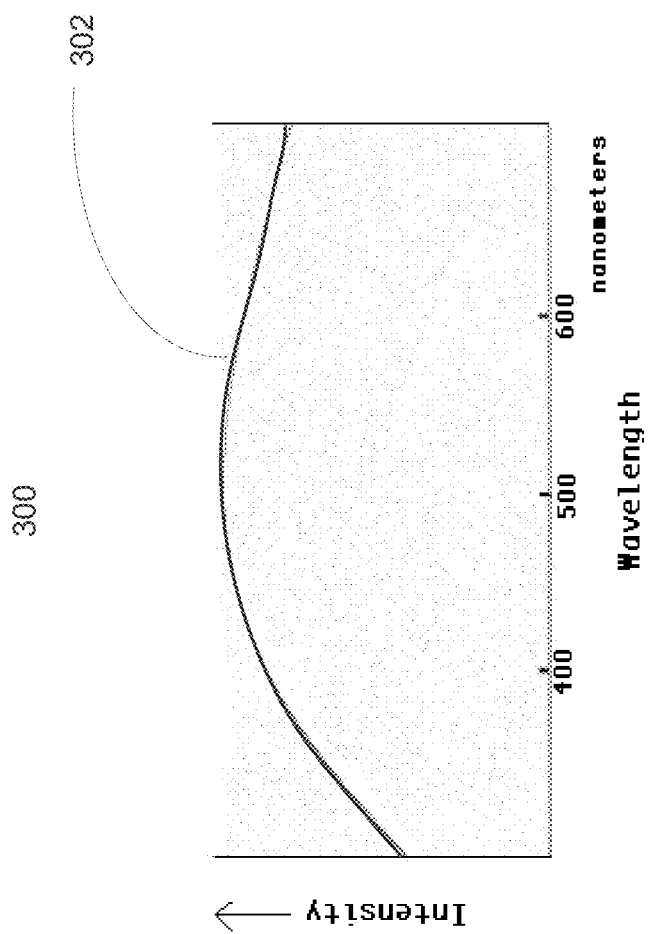
FIG. 3 is an exemplary spectrograph of sunlight.

FIG. 3 shows exemplary graph 300 of a spectrum provided by sunlight. Because the sun transmits most components of the visible electromagnetic spectrum, the measurement of intensity 302 shows a relatively smooth curve over several wavelengths, with the greatest intensity around 500 nm of wavelength. By measuring the intensity, the ambient light conditions may be determined and used. For example, as discussed above, if a high intensity of sunlight is detected, based upon a comparison of the intensity to a setpoint, the intensity of the backlight for a display, such as display 206 of FIG. 2, may be increased.

Figure 4:
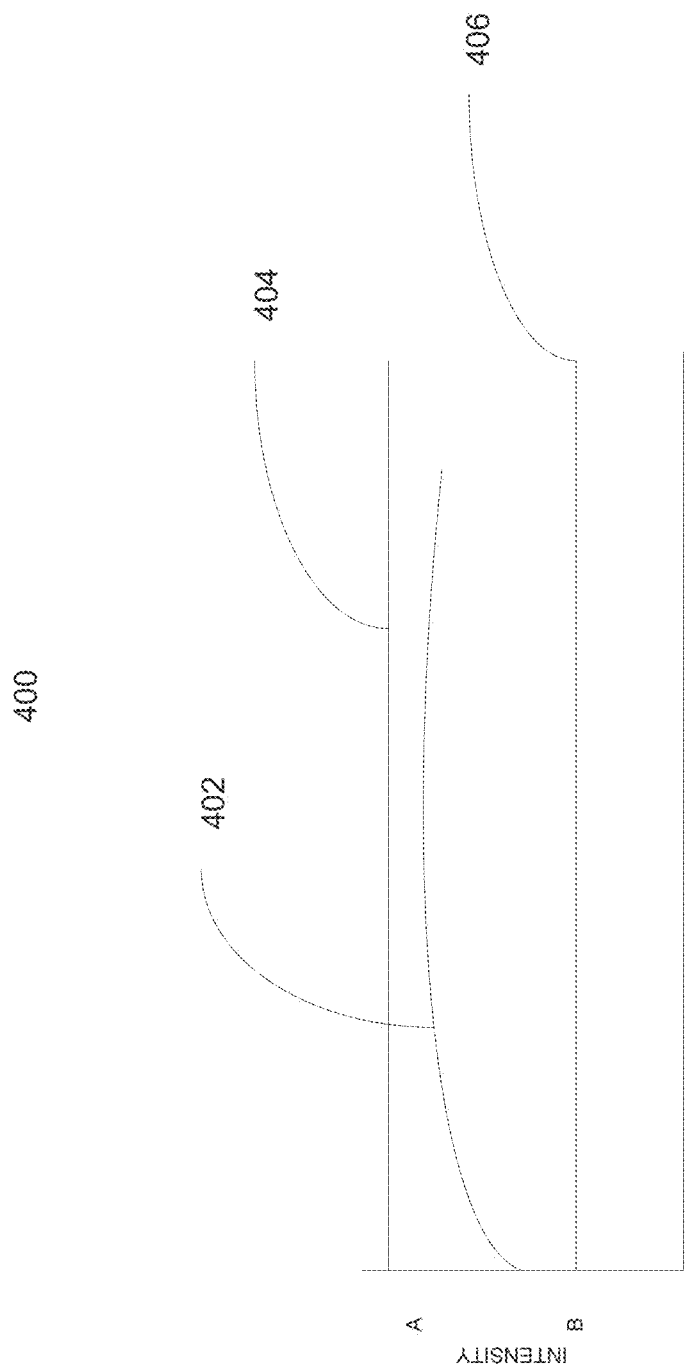
FIG. 4 is an exemplary graph showing multiple setpoints.

FIG. 4 is an exemplary graph 400 of a setpoint configuration for a mobile device. As shown, if the measured intensity 402 is greater than the high setpoint of 404, the backlight provided to the display and/or a backlight provided to the keypad may be changed because the high intensity may indicate daylight conditions. By contrast, if intensity 402 is measured to be below setpoint 406, the backlight provided to the display and/or keypad may be changed in a different manner because of a possible dark room condition.

Because most digital cameras, such as digital camera 104 of FIG. 1 and digital camera 204 of FIG. 2, can be used to detect and measure various frequencies of light, an output of the digital camera may be used to provided various functionalities. As shown in FIG. 3, the spectrum of sunlight is relatively smooth having smooth transitions across the spectrum. By contrast, light provided by some artificial sources, such as office lights, produce a spectrum showing high intensity only in certain wavelengths. FIG. 4 shows exemplary spectrum 500 of the light provided by a fluorescent light. Fluorescent light bulbs work by exciting the electrons of a gas, in this case mercury, and removing the excitation energy. The electrons release light (and heat) as they transition back to their ground state. The energy excites the inner coating of the light bulb, in most instances a phosphor, causing the phosphor to fluoresce, producing light.

Because the transition energy and florescence energy mainly consists of very specific wavelengths of energy, a spectrum of that energy would show a high intensity of those wavelengths. Spectrum 500 is an exemplary spectrum of light produced by a fluorescent light bulb. The spectrum shows a high intensity of light at wavelengths of 487 nm, 546 nm and 616 nm (shown by peaks 502, 504, and 506, respectively).

Figure 5:
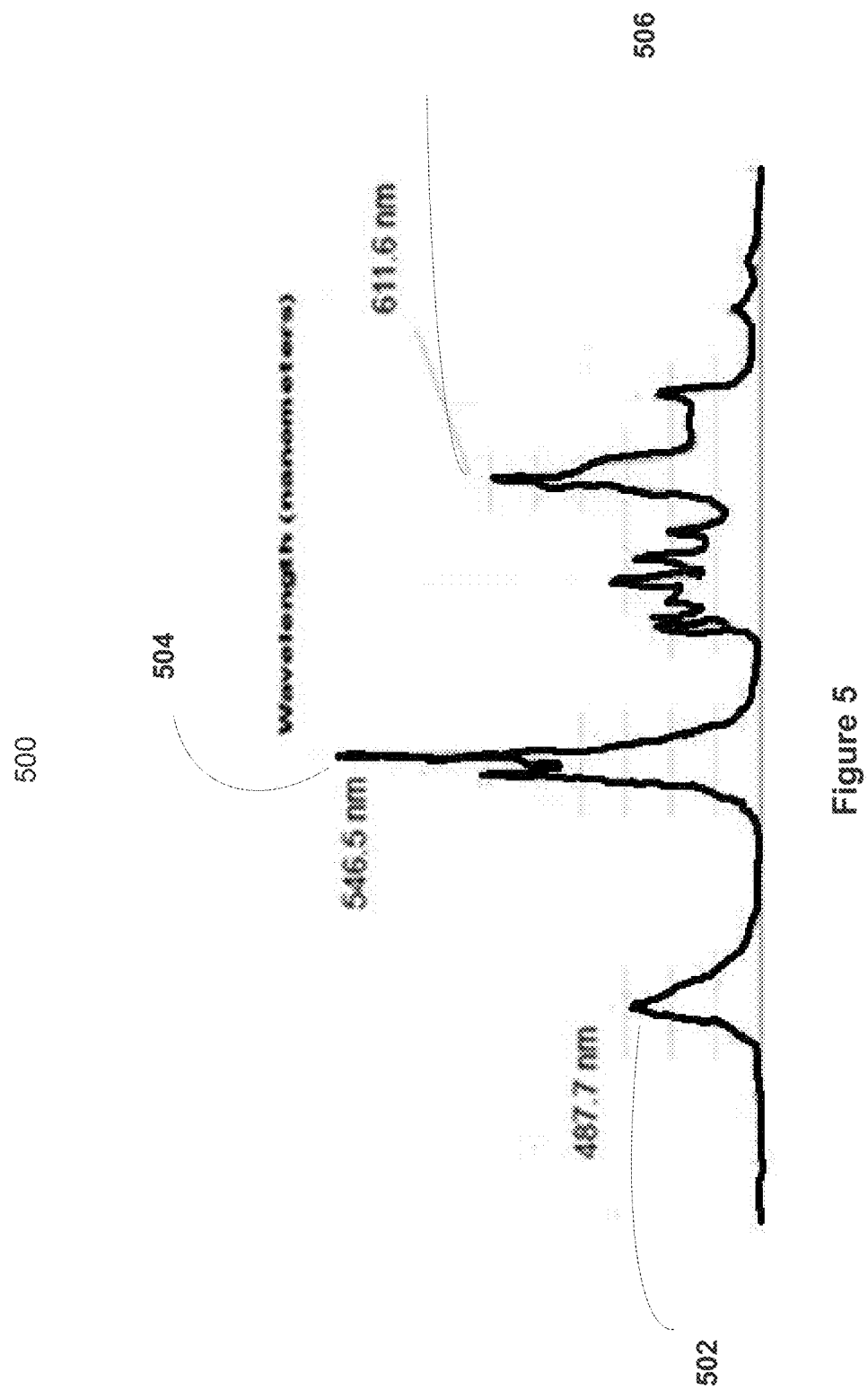
FIG. 5 is an exemplary spectrograph of fluorescent light.

Thus, if a digital camera, such as digital camera 104 of FIG. 1, measured a spectrum as shown in FIG. 5, it may indicate that the mobile device is inside a structure, such as a house or building. Thus, the mobile device may use that input to reconfigure other features of the mobile device. For example, a global positioning service may not be necessary when a user is inside a building. Thus, the mobile device, perhaps to reduce battery usage, may power down the global positioning service of the mobile device.

Further, if various qualities of the spectrum are determined, then the measured spectrum may be used to reconfigure the mobile device based upon those qualities. For example, various frequencies are difficult to detect by the human eye when viewed in the same context. For example, people with certain color blindness may have a difficult time to see blue and red in the same object. Thus, mobile device may be configured to alter the color or change the intensity of certain colors if detected by digital camera, thus possible making it easier for a user to view the object. Other frequency spectrums may be used. For example, the digital camera may detect a high level of ultraviolet light, and/or a prolonged exposure to UV light, and output a display to the user that there may be a chance of damage to the skin of the user, possibly via a sunburn. The infrared spectrum may be used as well.

Figure 6:
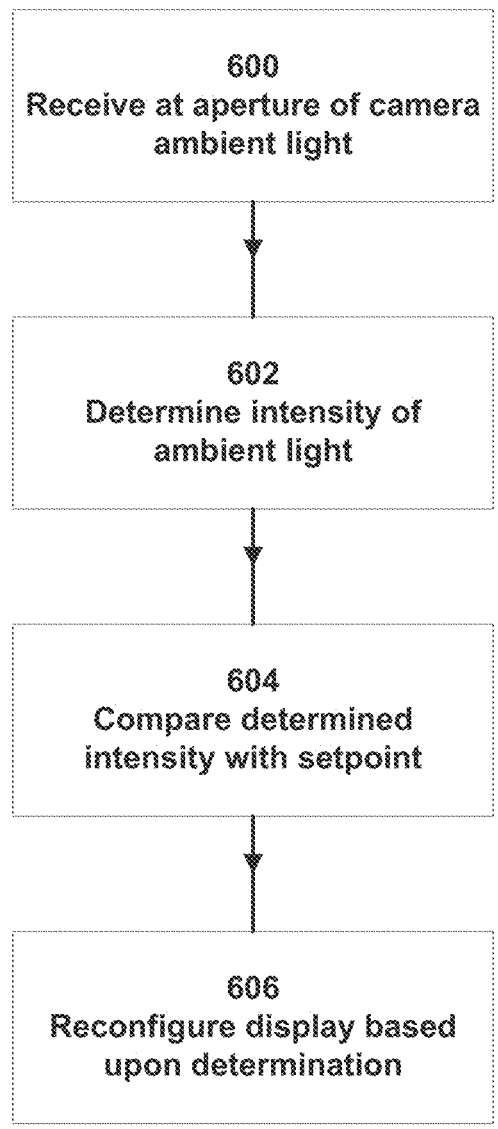
FIG. 6 is an exemplary method in accordance with the present subject matter.

FIG. 6 is an exemplary method of reconfiguring a device based upon the detected ambient light conditions. It should be understood that the adjustment of the backlight for a display and/or keypad of a mobile device is exemplary only, as the measured ambient light conditions may be used for other purposes, such as those illustrated above. Light energy is received at step 600 at an aperture of the digital camera. The intensity of the light energy is determined at step 602 and compared at step 604 with a setpoint. Based upon the comparison, the display is reconfigured at step 606. For example, the intensity of the backlight of the display may be reduced or increased or various colors may be enhanced. In another example, the display may be configured to indicate a possible dangerous amount of ultraviolet or infrared light.

While example embodiments of the disclosed subject matter have been described in connection with various computing devices, the underlying concepts can be applied to any computing device or system capable of implementing the disclosed subject matter. The various techniques described herein can be implemented in connection with hardware or software or, where appropriate, with a combination of both. Thus, the methods and apparatus for using a digital camera to detect ambient light conditions, or certain aspects or portions thereof, can take the form of program code (i.e., instructions) embodied in tangible media, such as floppy diskettes, CD-ROMs, DVDs, hard drives, or any other machine-readable storage medium, wherein, when the program code is loaded into and executed by a machine, such as a computer, the machine becomes an apparatus for implementing the disclosed subject matter. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for using a digital camera to detect ambient light conditions can also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing the disclosed subject matter. When implemented on a general-purpose processor, the program code combines with the processor to provide a unique apparatus that operates to invoke the functionality of the disclosed subject matter. Additionally, any storage techniques used in connection with the disclosed subject matter can invariably be a combination of hardware and software.

While the use of a digital camera to detect ambient light conditions has been described in connection with the various embodiments of the various figures, it is to be understood that other similar embodiments can be used or modifications and additions can be made to the described embodiment for performing the same function of providing the disclosed subject matter without deviating therefrom. For example, one skilled in the art will recognize that a system for implementing the present subject matter as described may apply to any environment, whether wired or wireless, and may be applied to any number of devices connected via a communications network and interacting across the network. Therefore, the present subject matter should not be limited to any single embodiment, but rather should be construed in breadth and scope in accordance with the appended claims.

What is claimed is:

1. A method comprising:
   receiving light via an aperture of a camera;
   determining an intensity of the received light;
   comparing the intensity to a setpoint to generate a reconfiguration output; and
   reconfiguring a feature of a mobile device based upon the reconfiguration output, wherein reconfiguring comprises:
      detecting that the received light comprises light indicative of the color red and the color blue; and
      altering one of the light indicative of the color red or blue to a respective other color.

2. The method of claim 1, wherein the camera comprises one of:
   a camera that is permanently affixed to the mobile device; or
   a camera that is removable from the mobile device.

3. The method of claim 1, wherein the camera comprises a web camera in communication with the mobile device.

4. The method of claim 1, wherein the measurement of the received light comprises a measurement and determination of the intensity of the received light in at least one of the electromagnetic spectrum, the visible light spectrum, the infrared light spectrum, the ultraviolet light spectrum, or a specific range of frequencies related to a particular light source.

5. The method of claim 1, wherein the setpoint is related to the intensity of the received light.

6. The method of claim 1, wherein the reconfiguration output is an output to increase a backlight level of a display of the mobile device when the intensity of the received light is greater than the setpoint or decrease the backlight level of the display when the intensity of the received light is lower than the setpoint.

7. The method of claim 1, wherein the reconfiguration output is an output to decrease a backlight level of a keypad of the mobile device when the intensity of the received light is greater than the setpoint or increase the backlight level of the display when the intensity of the received light is lower than the setpoint.

8. The method of claim 1, wherein the setpoint is based upon an intensity of fluorescent light.

9. The method of claim 1, further comprising powering down a feature of the mobile device based on a comparison of the received light to the setpoint.

10. The method of claim 9, wherein the feature comprises a global positioning service.

* * * * *